UNITED STATES PATENT OFFICE.

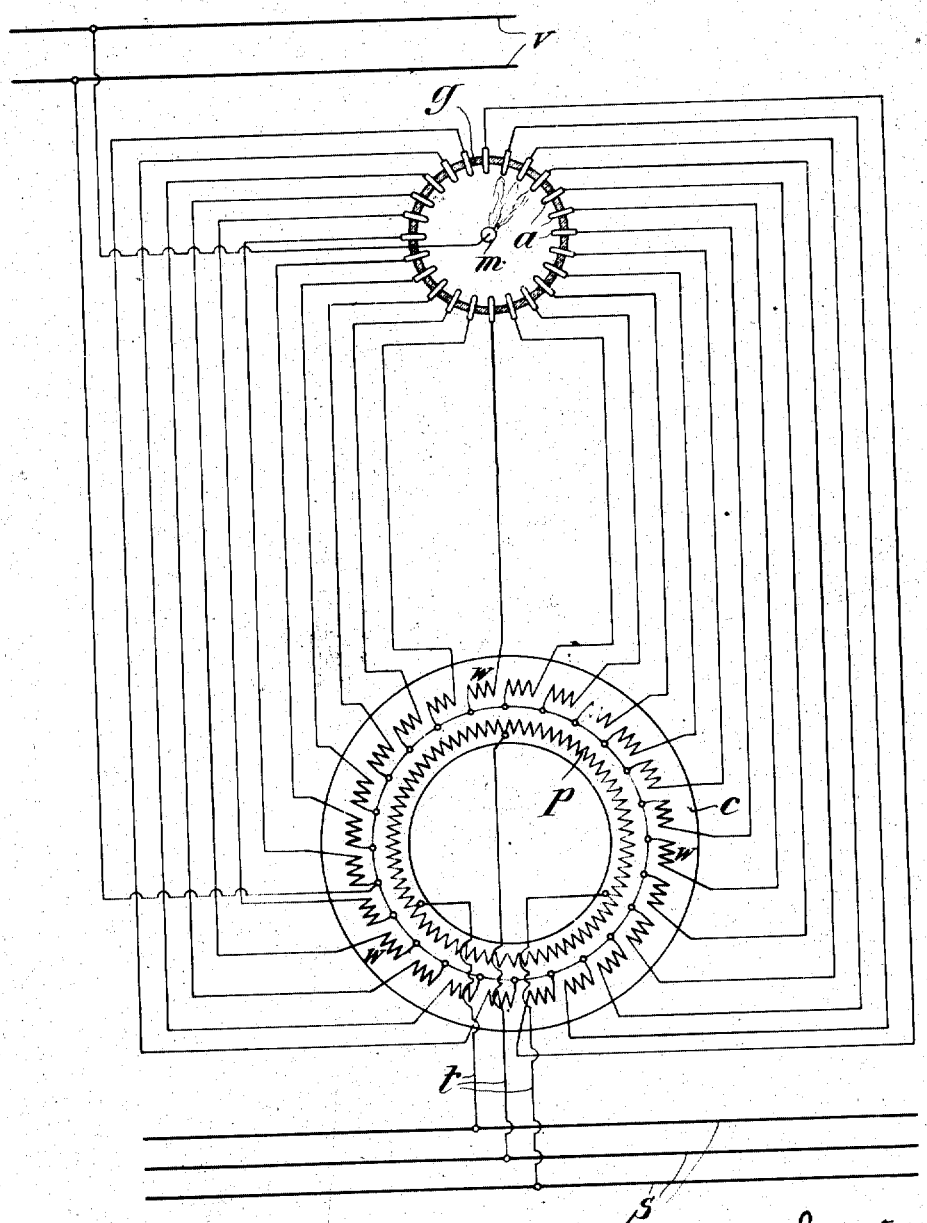

ERNST OELSCHLÄGER, OF BERLIN-CHARLOTTENBURG, GERMANY, ASSIGNOR TO SIEMENS-SCHUCKERTWERKE, G. M. B. H., OF BERLIN, GERMANY, A CORPORATION OF GERMANY.

RECTIFIER FOR POLYPHASE ALTERNATING CURRENTS.

1,218,952.     Specification of Letters Patent.     Patented Mar. 13, 1917.

Application filed November 20, 1913. Serial No. 802,151.

*To all whom it may concern:*

Be it known that I, ERNST OELSCHLÄGER, a German citizen, and resident of Berlin-Charlottenburg, Germany, have invented certain new and useful Improvements in Rectifiers for Polyphase Alternating Currents, of which the following is a specification.

My invention relates to rectifiers of the class employing liquid mercury or another metal in an evacuated space, whereby alternating currents may be rectified or converted into unidirectional or continuous current by the well known unipolar properties of the mercury or metal arc. The present practice of converting polyphase alternating currents into unidirectional or continuous current by means of such rectifiers consists in general therein that the one pole of the continuous current consumption device—for instance a storage battery to be charged—is connected with the zero-point of a polyphase system and the other pole with the mercury, whereby the ends of the phase circuits will form in periodical alternation the anodes of the rectifier. At given voltage the output of such rectifiers is limited by the electrical strain imposed upon the electrodes, as above a certain current strength the electrode-temperature will become too high and impair the proper working of the rectifier. A greater output of such rectifiers for a given three-phase current can be attained by converting the same in a six-phase current by means of a phase-transformer whose zero-points form the electrical centers of the secondary winding. This arrangement, however, does not meet the requirements of practice and therefore a subdivision of the electrodes has been resorted to, by subdividing each electrode in about three parallel ones, in order to obtain at each three uniform arcs which will serve to reduce the strain imposed upon the individual electrodes. This latter arrangement, which will fulfil the purpose of the uniformity of the parallel arcs, is safeguarded by providing resistances before each electrode. This, however, in case of inductive resistances can only be sufficiently attained by admitting a greater drop of voltage.

The new apparatus according to this invention now consists in a phase-transforming and rectifying arrangement for polyphase currents, whereby the electrodes may be freed from the electrical strain to any desired extent and under losses which are a minimum attained in mercury rectifiers.

In brief, the arrangement according to my invention can be regarded as a combination of an electro-mechanical rectifier and a metal-vapor rectifier. This mechanical rectifier consists of a continuous current armature fixed in space, having polyphase currents supplied at a proper number of evenly distributed points, while rectified or continuous current may be obtained by a current collecting device which is rotating upon the commutator of the armature in synchronism to the frequency of the polyphase currents. Instead of the rotating current collecting device of this latter arrangement, now, I utilize the unipolarity of a mercury arc. In other words by my present invention I avoid the defects and combine the advantages of either mode of rectification; more particularly I do away with the disadvantage of using the rotating current collecting devices of the aforementioned electro-mechanical rectifier, and on the other hand I obviate the difficulty inherent to vapor rectifying apparatus, viz: to provide a sufficient number of consecutive phase-displaced circuits which are advantageously present in the armature of said electro-mechanical rectifier in the form of winding elements between every two successive segments of the commutator.

My invention will be more fully understood by reference to the accompanying drawing which shows in a diagrammatic view the apparatus and connections of the rectifier of my present invention.

The continuous current mains to be supplied from the rectifier are represented by $v$ and are connected on the one hand with the mercury $m$ of the rectifier $g$ and on the other hand with the zero-point of the phase-windings $w$ of a phase transformer. In order to provide this zero-point the winding is subdivided into as many parts or phases $w$ as may be desirable, and each part or phase $w$ is connected at one end with the common zero-point and at its other end with one of the electrodes $a$ of the rectifier. The number of these electrodes must of course be the same as that of the number of parts or phases $w$ of the winding, and in connecting the several phases with the electrodes $a$ the same order of succession must be observed, so that a rotating field traversing the windings $w$ will cause the maximum voltage between the cathode and the series of anodes $a$ to travel circularly around the anodes. The winding with its multiplicity of subdivided parts or phases $w$ now is mounted in even distribution together with a primary distributed polyphase winding $p$ on a common iron core $c$ in the manner of a phase transformer employing the principle of the rotating field. The polyphase supply line which generally will be three-phase is indicated at $s$ and conductors $t$ lead from the mains of the supply line $s$ to three evenly spaced points of said distributed primary winding $p$, as shown in the drawing.

The mode of operation of my present rectifier will now be immediately apparent from the above explanations. The parts or phases $w$ of the phase-windings $w$ which form the secondary of the phase transformer will thus generate a multiplicity of E. M. F.'s which periodically alternate and whose maximum values are rotating through the phases $w$. While thus at every instant one half of the voltages between cathode $m$ and anodes $a$ will be of positive sign, discharges will take place between the anodes and the cathode or mercury of the rectifier. According to this progression or rotation of the E. M. F.'s in the secondary winding of the phase transformer the entire arc between an anode $a$ and the mercury $m$ of the rectifier $g$ will also rotate in synchronism to the rotary field of the phase transformer. The drop of voltage in the arc will be of a definite moderate value, and the rectified current in the mains $v$ will pulsate somewhat in value. These pulsations will become the more smoothened up, the greater the number of the phases $w$ of the secondary winding of the phase-transformer will be. The electrical strain imposed upon the several electrodes will also be decreased with the number of electrodes employed by reason of the rectified current being distributed upon a greater number thereof.

It is apparent that in the apparatus of my present invention the electrical strain imposed upon the electrodes may be reduced to a minimum and the smoothening of the pulsating continuous current wave may be attained to any desired extent. Moreover both these advantages are secured with very simple means, and the further perfection of the rectifying apparatus—as regards regularity of the rectified current as well as reduction of the electrical strain on the electrodes— will simply require the addition of more winding parts or phases $w$ in the secondary of the phase transformer.

In the foregoing I have described my invention as being applied to a mercury vapor rectifier, it must be understood, however, that the mercury may be replaced by another metal if desirable. Also the operation of the apparatus described may be reversed, that is to say, continuous current may be supplied to the mercury rectifier and polyphase current taken off from the phase transformer.

Having thus described my invention I claim as new and desire to secure by Letters Patent of the United States:—

1. In combination, a source of polyphase alternating currents of a given number of phases, means for producing a rotary magnetic field with current from said source, a multiplicity of phase-windings mounted to be subject to induction from said rotary field, a vapor rectifying device having anodes connected to said system of windings, and a continuous current circuit derived from the cathode of said rectifying device and a zero-point of said system of windings.

2. In combination, a system of phase-windings distributed on a magnetizable core, a vapor rectifying device having anodes connected to said phase-windings, a continuous current circuit derived from the cathode of said rectifying device and a zero-point of said system of phase windings, and means for generating a rotary field in said magnetizable core.

3. In combination, a system of phase windings, a vapor rectifying device having anodes connected in succession to the phases of said system, a continuous current circuit derived from the cathode of said rectifying device and a zero-point of said system of windings, and electromagnetic means for inducing in said phase-windings E. M. F.'s which are progressing through the several phases.

4. In combination, a polyphase alternating current source of a given number of phases; means for producing a rotary magnetic field with current from said source; a phase-transformer having a distributed primary winding of said given number of phases and a distributed secondary winding of a relatively great number of phases; a vapor rectifying device having circularly arranged anodes of a number corresponding to that of the phases of said secondary winding and connected thereto in the sense of the phase rotation in said winding; and a continuous current circuit derived from the cathode of said rectifying device and a zero-point of said phase-transformer.

5. In combination, a polyphase alternating current source of a given number of phases; means for producing a rotary magnetic field with current from said source; a phase-transformer having a distributed primary winding of said given number of phases and a distributed secondary winding of a relatively great number of phases; a vapor rectifying device having circularly arranged anodes of a number corresponding to that of the phases of said secondary winding and connected in the sense of the phase rotation of said winding; and a continuous current circuit derived from the cathode of said rectifying device and a zero-point of said secondary winding.

6. In combination, a polyphase alternating current source of a given number of phases; means for producing a rotary magnetic field with current from said source; a phase-transformer having a distributed primary winding of said given number of phases and a distributed secondary winding of a relatively great number of phases; a vapor rectifying device having a cathode and anodes of a number corresponding to that of the phases of said secondary winding and connected thereto in the sense of phase rotation of said winding and permitting automatic rotation of the arc between said cathode and said anodes in synchronism to the rotations of the field of said phase-transformer; and a continuous current circuit derived from said cathode and a zero-point of said phase-transformer.

7. In combination, a system of phase-windings distributed on a magnetizable core and connected in star; a vapor rectifying device having anodes connected to the free ends of said phase-windings; said anodes being placed around the cathode of said rectifying device to permit automatic rotation of the arc in synchronism to the progression of the voltages through said phase-windings; means for generating a rotary field in said magnetizable core and therewith progressive phase voltages in said phase-windings; and a continuous current circuit derived from said cathode and the star point of said phase-windings.

In witness whereof I have hereunto set my signature in the presence of two subscribing witnesses.

ERNST OELSCHLÄGER.

Witnesses:
  HENRY HASPER,
  WOLDEMAR HAUPT.